(No Model.) 2 Sheets—Sheet 1.

J. C. DRAKE.
PEANUT PLANTER.

No. 601,130. Patented Mar. 22, 1898.

Witnesses
Wm. H. Edwards Jr.
Victor J. Evans

Inventor
Joseph C. Drake
By John Wedderburn
Attorney (No Model.) 2 Sheets—Sheet 2.
J. C. DRAKE.
PEANUT PLANTER.
No. 601,130. Patented Mar. 22, 1898.
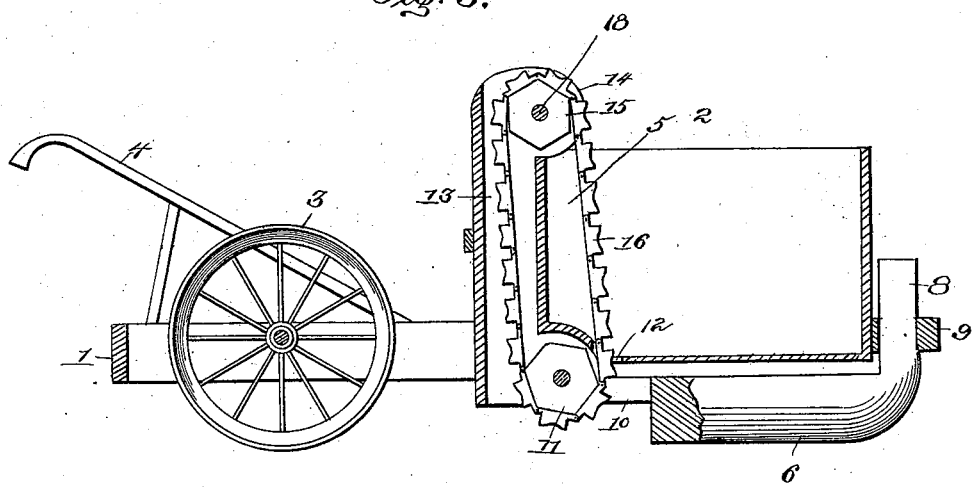
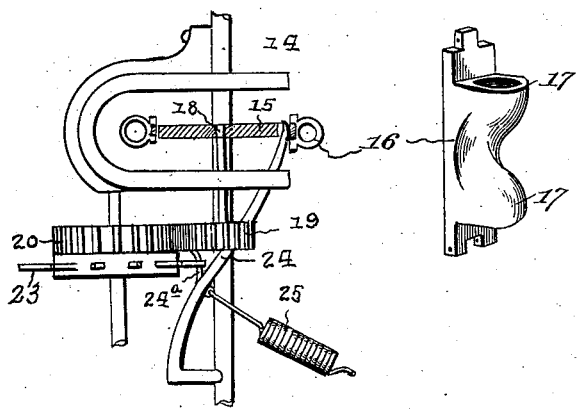
Witnesses
Wm H. Edwards Jr.
Victor J. Evans
Inventor
Joseph C. Drake
By John Wedderburn
Attorney

UNITED STATES PATENT OFFICE.

JOSEPH C. DRAKE, OF CAPRON, VIRGINIA.

PEANUT-PLANTER.

SPECIFICATION forming part of Letters Patent No. 601,130, dated March 22, 1898.

Application filed September 24, 1897. Serial No. 652,796. (No model.)

*To all whom it may concern:*

Be it known that I, JOSEPH C. DRAKE, a citizen of the United States, residing at Capron, in the county of Southampton and State of Virginia, have invented certain new and useful Improvements in Peanut-Planting Machines; and I do hereby declare the following to be a full, clear, and exact description of the invention, such as will enable others skilled in the art to which it appertains to make and use the same.

This invention relates to improvements in planters, and has more particular relation to peanut-planters.

The invention consists of certain novel constructions, combinations, and arrangements of parts, all of which will be hereinafter more particularly set forth and claimed.

Figure 1:
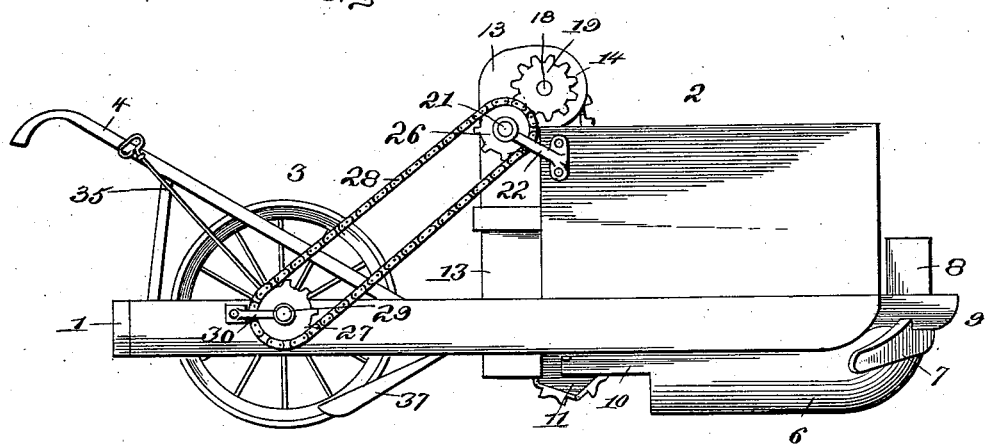
Figure 2:
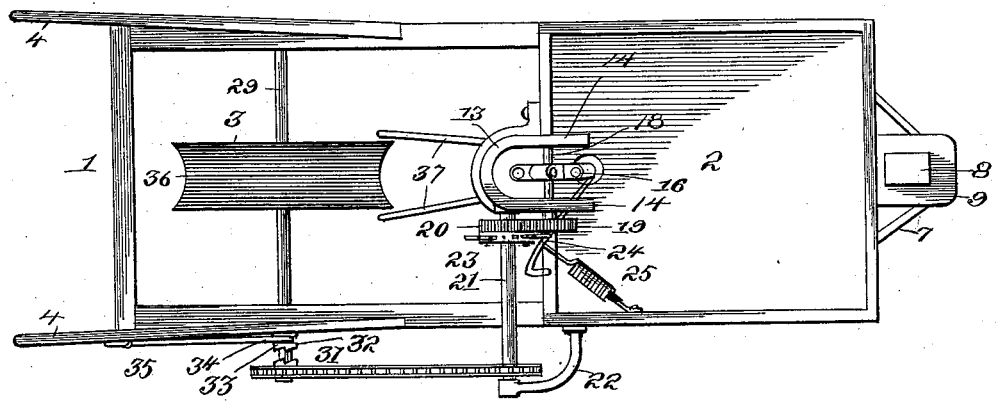

In the accompanying drawings, forming part of this specification, Figure 1 represents a side elevation of the machine embodying my invention. Fig. 2 represents a top plan view of the same. Fig. 3 represents a central vertical longitudinal section through my said improved planter. Fig. 4 represents an enlarged detail perspective view of one of the cups of the endless chain, and Fig. 5 is an enlarged detail view of the striker-arm and the means for actuating the same to intermittently strike the seed-cup-carrying chain.

1 represents the frame; 2, the hopper; 3, the covering-wheel, and 4 the handles. Said frame may be of any desired construction and material and is provided at its forward end with a plow 6 and two cutting-wings 7. The wings and plow are connected to the lower end of a bar 8, which is supported in a projection 9, extending from the front end of the frame. By means of said plow and wings the desired furrow is opened in the soil and the soil thrown to each side of the same. The rear portion of said plow 6 is bifurcated, as at 10, to accommodate a chain-supporting wheel 11, which is suitably journaled therein.
The hopper 2, which is adapted to hold the seed, is mounted upon the frame 1 immediately above the plow 6 and is formed in its bottom with an opening 12, which coincides in position with the bifurcated end 10 of said plow 6, so as to form a passage for the endless conveying-chain 5, as will be hereinafter more particularly described. A chute 13 is mounted to the rear of the hopper 2 and projects downward into proximity to the rear end of the plow 6, so as to form a guide for the endless chain 5. The upper portion of said chute is formed with two forwardly-projecting spaced arms 14, between which is journaled a chain-supporting wheel 15.

It will be observed from the foregoing description that the endless chain 5 passes down through said chute 13, over the wheel 11, up through the hopper 2, and over the wheel 15. The said chain or conveyer 5 comprises a plurality of links 16, suitably pivoted together and each consisting of two oppositely-facing cups 17, one of which is adapted to receive a supply from the hopper as it passes upwardly through the same. The said wheel 15 is supported in position by a transverse shaft 18, which projects laterally from the arms 14 and is provided with a gear 19, which meshes with a similar gear 20, mounted upon a shaft 21, which latter has its ends journaled in the wall of said chute 13 and a supporting-standard 22, mounted upon the hopper. Said wheel 20 is provided with a plurality of radiating arms or fingers 23, which are adapted to engage a pivoted arm or agitator 24, mounted upon the rear part of the hopper to lie in the path of the fingers 23 of the rotatable wheel 20, and said striker-arm 24 is adapted to engage the endless chain to agitate the same and cause the discharge of the seed from the respective cups of the same. Said arm 24 is normally held in contact with the said endless chain by means of a coil-spring 25, which connects it with the said hopper 2. When said agitator is struck by the pins 23, it is drawn away from the endless conveyer against the tension of said spring 25, so that when released from said pins it will spring back against the conveyer, and thus impart the desired concussion. As the chain passes up through the hopper 2 the seed are caught in the upwardly-facing cups 17; but as the said chain turns the upper wheel 15 these cups are reversed and the seed drops from the same into the remaining cups, which have then assumed the proper position to catch said seed. As the movement of the chain continues the seed are discharged from said latter cups when the same turn the lower wheel 11 and are thus reversed. In order to impart movement to the shaft 21, I provide the outer end of the same with a sprocket-wheel 26, which communicates with a sprocket-wheel 27 by means of a sprocket-chain 28. Said sprocket-wheel 27 is loosely mounted upon a transverse shaft 29, which is journaled in the frame 1 and an angular bracket 30, secured to the side of said frame. Said wheel 27 is provided with one member 31 of a clutch, which is adapted to engage with a companion member 32, which latter is splined upon said shaft 29, so that it may slide longitudinally thereon, but rotate therewith. This member 32 is formed with an annular groove 33, into which projects the yoke end 34 of a clutch-lever 35, which latter is pivotally mounted upon the frame 1 and is held in position by any suitable form of lever-clamp. The covering-wheel is rigidly mounted upon said shaft 29, so that its rotation will cause the rotation of said shaft, and thus impart the desired movement to the planting-chain. The periphery of the wheel 3 is formed with a V-groove 36, so that the soil upon each side of the furrow will be forced back into the furrow and packed tightly down in place after the seed has been deposited. To further assist in this action of forcing the soil into the furrow I provide two curved covering arms or knives 37, which are connected to the rear of the hopper 2 and project downwardly and inwardly toward the periphery of said wheel 3. The handles 4 may be of any desired construction and material and are secured to the frame 1, so that the latter may be guided thereby.

It will be observed from the foregoing description that as the machine passes forward a furrow is first opened by the plow and furrow-wings. The seed is then fed at predetermined intervals from the hopper through the discharge-chute and discharged into the furrow, and, lastly, the soil is forced down compactly over the seed by the covering knives and wings. The use of supporting-wheels is altogether avoided, as neither machine is supported upon the covering-wheel 3 and the furrow-forming plow 6, the degree of pressure upon the latter being regulated by the pressure exerted upon the handles 4 4. The operation of the machine is accompanied with very little friction, and the seed are planted at predetermined intervals which are limited by the length of the links in the endless conveyer or chain.

The construction and operation are very simple and cheap, but at the same time most effective, as the forward movement of the machine causes a positive feed of the seed from the feed-hopper into the furrow. When the machine is being transferred from place to place, the clutch is operated so as to throw the endless chain and its operating-gearing out of gear, and thus permit the wheel 3 to rotate freely independently of the remaining parts of the machine.

Having thus described my invention, what I claim as new, and desire to secure by Letters Patent, is—

1. In a seed-planter of the class described, the combination with the seed-dropping-cup chain, of a pivoted arm, and means to vibrate said arm to intermittently strike said chain, substantially as described.

2. In a seed-planter of the class described, the combination with the seed-dropping-cup chain, of a pivoted arm, a spring normally holding one end of the said arm in engagement with the chain, a rotatable wheel having a series of pins on its periphery adapted to successively engage said arm and move it out of contact with the chain against the force of the spring and to release it to strike said chain, substantially as described.

3. In a seed-planter, the combination with a suitable frame, of a furrow-opener, a seed-hopper having an opening in its bottom near one side, a chute exterior of the hopper adjacent to said side, an endless seed-dropping-cup chain mounted to travel through said opening upwardly in the hopper and down the chute, said chain comprising a series of links pivoted together and each having a pair of integral, oppositely-facing cups, and a vibrating arm to intermittently strike said chain, substantially as described.

4. In a seed-planter, the combination with a suitable frame, of a furrow-opener having a bifurcated rear end, a seed-hopper having an opening in its bottom near one side and between the bifurcations of the furrow-opener, a chute exterior of the hopper adjacent to said side, an endless seed-dropping chain mounted to travel between said bifurcations up through said opening and the hopper and down the chute, said chain comprising a series of links pivoted together and each having a pair of integral, oppositely-facing cups, and a vibrating arm to intermittently strike said chain, substantially as described.

In testimony whereof I have signed this specification in the presence of two subscribing witnesses.

JOSEPH C. DRAKE.

Witnesses:
L. A. GAY,
W. M. HART.